United States Patent
Yan et al.

(10) Patent No.: US 9,549,042 B2
(45) Date of Patent: Jan. 17, 2017

(54) CONTEXT RECOGNITION AND SOCIAL PROFILING USING MOBILE DEVICES

(71) Applicant: Samsung Electronics Company, Ltd., Suwon, Gyeonggi-Do (KR)

(72) Inventors: Zhixian Yan, San Jose, CA (US); Jun Yang, Milpitas, CA (US); Emmanuel M. Tapia, Newark, DE (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/089,690

(22) Filed: Nov. 25, 2013

(65) Prior Publication Data
US 2014/0302790 A1    Oct. 9, 2014

Related U.S. Application Data

(60) Provisional application No. 61/808,560, filed on Apr. 4, 2013.

(51) Int. Cl.
*H04L 29/08* (2006.01)
*G06Q 30/02* (2012.01)

(52) U.S. Cl.
CPC ............ *H04L 67/306* (2013.01); *G06Q 30/02* (2013.01)

(58) Field of Classification Search
CPC .................................................. H04L 67/306
See application file for complete search history.

(56) References Cited

U.S. PATENT DOCUMENTS

| 7,877,082 | B2 | 1/2011 | Eagle et al. |
| 7,920,849 | B2 | 4/2011 | Pop |
| 8,341,223 | B1 | 12/2012 | Patton et al. |
| 8,359,643 | B2 | 1/2013 | Low et al. |
| 8,417,777 | B2 | 4/2013 | Hutchison et al. |
| 2002/0183068 | A1 | 12/2002 | Dunko et al. |
| 2007/0124721 | A1 | 5/2007 | Cowing et al. |
| 2009/0209202 | A1 | 8/2009 | Martini et al. |

(Continued)

FOREIGN PATENT DOCUMENTS

| EP | 2433416 A1 | 3/2012 |
| EP | 2166788 B1 | 8/2012 |

(Continued)

OTHER PUBLICATIONS

International Search Report and Written Opinion dated Jul. 17, 2014 for International Application No. PCT/KR2014/002747 from Korean Intellectual Property Office, pp. 1-9, Daejeon, Republic of Korea.

(Continued)

*Primary Examiner* — David Bilodeau
(74) *Attorney, Agent, or Firm* — Sherman IP LLP; Kenneth L. Sherman; Steven Laut

(57) ABSTRACT

A method for using Bluetooth® information for inferring user context and computing sociability is presented. The method includes receiving wireless sensor data from wireless sensor communication for an electronic device. Information units are formed using the wireless sensor data. User context is inferred using the information units. An entropy metric is computed based on the inferred user context. Social profiling is created based on the entropy metric and one or more user context characteristics.

29 Claims, 14 Drawing Sheets

(56) References Cited

U.S. PATENT DOCUMENTS

| | | |
|---|---|---|
| 2009/0249198 A1 | 10/2009 | Davis et al. |
| 2010/0185630 A1 | 7/2010 | Cheng et al. |
| 2010/0240298 A1 | 9/2010 | McKenna et al. |
| 2010/0280904 A1 | 11/2010 | Ahuja |
| 2010/0299615 A1 | 11/2010 | Miluzzo et al. |
| 2011/0125744 A1 | 5/2011 | Immonen et al. |
| 2011/0177802 A1 | 7/2011 | Gupta |
| 2011/0191352 A1 | 8/2011 | Jones et al. |
| 2012/0072381 A1 | 3/2012 | Cao et al. |
| 2012/0079019 A1 | 3/2012 | Miettinen et al. |
| 2012/0149309 A1 | 6/2012 | Hubner et al. |
| 2012/0150960 A1 | 6/2012 | Nalawade |
| 2012/0239479 A1* | 9/2012 | Amaro et al. ............ 705/14.23 |
| 2012/0258665 A1 | 10/2012 | Sip |
| 2012/0278132 A1* | 11/2012 | Weigh et al. ................ 705/7.34 |
| 2013/0006749 A1 | 1/2013 | Fink et al. |
| 2013/0012220 A1 | 1/2013 | Waris et al. |

FOREIGN PATENT DOCUMENTS

| | | | |
|---|---|---|---|
| EP | 2518680 A1 | 10/2012 | |
| WO | 2012038782 A1 | 3/2012 | |

OTHER PUBLICATIONS

Do, T.M.T. et al., "GroupUs: Smartphone Proximity Data and Human Interaction Type Mining", Proceedings of the 2011 15th International Symposium on Wearable Computers (ISWC '11), Jun. 12, 2011, pp. 21-28, ACM, United States.

Eagle, N. et al, "Reality mining: sensing complex social systems", Personal and Ubiquitous Computing, May 2006, pp. 225-268, vol. 10, Issue 4, United States.

Vu, L. et al., "Jyotish: Constructive approach for context predictions of people movement from joint Wifi/Bluetooth trace", Proceedings of the 9th Annual IEEE, International Conference on Pervasive Computing and Communications (PerCom 2011), Dec. 2011, pp. 690-704, vol. 7, Issue 6, IEEE, United States.

Eagle, N. et al., "Social Serendipity: Proximity Sensing and Cueing", MIT Media Laboratory Technical Note, Oct. 2004, pp. 1-16, MIT Media Laboratory, United States.

Extended European Search Report dated Oct. 11, 2016 for European Application No. 14779198.2 from European Patent Office, pp. 1-7, Munich, Germany.

\* cited by examiner

| Unix Time | device MacAddress | device name | device class | RSSI |
|---|---|---|---|---|
| 1346201663 | 8C:C8:CD:C4:65:12 | Tom's Macbook Pro | Laptop | -76 |
| 1346201663 | 58:55:CA:FF:4F:AA | Bob's Galaxy III | Smartphone | -78 |
| 1346201668 | 60:C5:47:22:A8:36 | John's iPhone | Smartphone | -83 |
| ... | ... | ... | ... | ... |

FIG. 4

| | Symbol | Definition | Description |
|---|---|---|---|
| Bluetooth Counter Features ($F_{count}$) | $N_{all}$ | $|\{r_{t_1}, \ldots, r_{t_2}\}|$ | the total number of Bluetooth readings in current unit $U_w$ |
| | $N_{unique}$ | $|\text{unique }\{r_{t_1}, \ldots, r_{t_2}\}|$ | the number of unique Bluetooth Mac addresses in $U_w$ |
| | $N_{new}$ | $|N_{unique}(U_w) - N_{unique}(U_{w-1})|$ | the new Bluetooth devices appearing in current unit compared to previous one |
| Bluetooth Entropy Features ($F_{entropy}$) | $E_{basic}$ | $-\Sigma p_i * \log p_i$ | the entropy of Bluetooth readings that indicates the devices diversity |
| | $rssi_{avg}$ | $\text{avg}(RSSI(U_w))$ | the average RSSI signal values |
| | $rssi_{var}$ | $\text{var}(RSSI(U_w))$ | the variance of the RSSI signal values |
| | $E_{rssi}$ | $-\Sigma p'_i * \log p'_i$ | the weighted entropy that considers the RSSI signal strength in computing $E$ |
| Bluetooth Semantic Features ($F_{semantic}$) | $sem_{major}$ | $(P_{maj_1}, P_{maj_2}, \ldots, P_{maj_{ma}})$ | the vector indicates the percentage of Bluetooth device major class, i.e., Computer, Phone, Network Access Point, Wearable etc. |
| | $sem_{minor}$ | $(P_{min_1}, P_{min_2}, \ldots, P_{min_{mb}})$ | the vector indicates the percentage of Bluetooth device minor class, i.e., Computer (server, PC, laptop, tablet), Phone (smartphone, cellular) |
| | $sem_{name}$ | $(P_{name_1}, P_{name_2}, \ldots, P_{name_{mc}})$ | the massive vector indicates the percentage of each Bluetooth device's appearance e.g. {Tom's Macbook Pro, Bob's Galaxy III, John's iPhone} in Table 1 |
| | $sem_{topic}$ | $(P_{topic_1}, P_{topic_2}, \ldots, P_{topic_{mk}})$ | the computed probability vector of $m_k$ topics of a unit based on the inside devices names using the topic model like LDA |
| Unit Stability/Similarity Features ($F_{similarity}$) | $S_{jaccard}$ | $\dfrac{N_{unique}(U_w \cap U_{w-1})}{N_{unique}(U_w \cup U_{w-1})}$ | stability based on the Jaccard index (similarity coefficient) of unique devices |
| | $S_{cosine}$ | $\dfrac{sem(U_w) \cdot sem(U_{w-1})}{\|sem(U_w)\| \times \|sem(U_{w-1})\|}$ | the cosine similarity based on the Bluetooth device class (or name) vector |

FIG. 8

Input: Bluetooth unit sequence $U = \{U_1, \cdots, U_n\}$, a regression error bound ($\in$)
Output: a sequence of Bluetooth segments $S = \{S_1, \cdots, S_k\}$ 1 begin
2     $W \leftarrow \emptyset, S \leftarrow \emptyset$; // initialize the first empty window
3     while *hasNextUnit()* do
4        $U$ = nextUnit($U$);
5        $F$ = featureExtract($U$); // count and entropy
6        $err$ = linearRegressionModel($W \cup F$);
7        if $err < \in$ then
8           // continuously grow current window with next unit;
9           $S \leftarrow S \cup U; W \leftarrow W \cup F$;
10          continue;
11       else
12           // stop grow: a new segment appears
13           $S$.add($S$);
14           $W \leftarrow F; S \leftarrow U;$ //start a window

FIG. 10

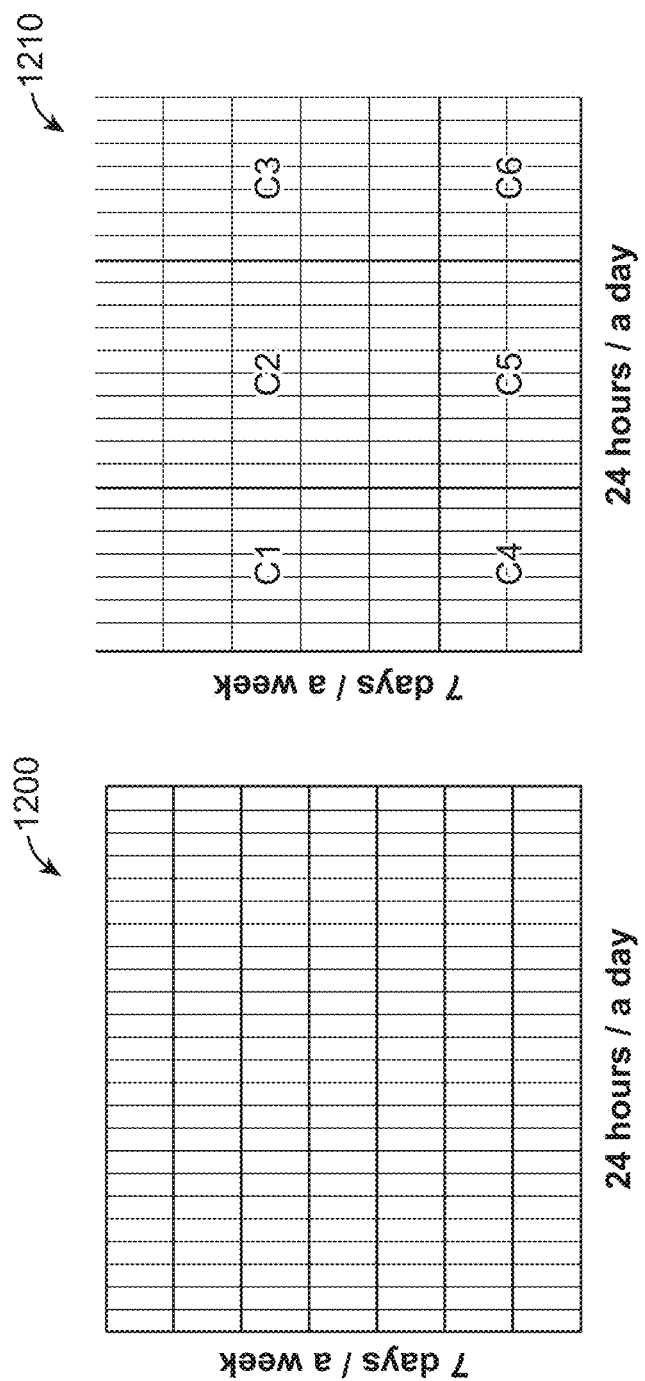

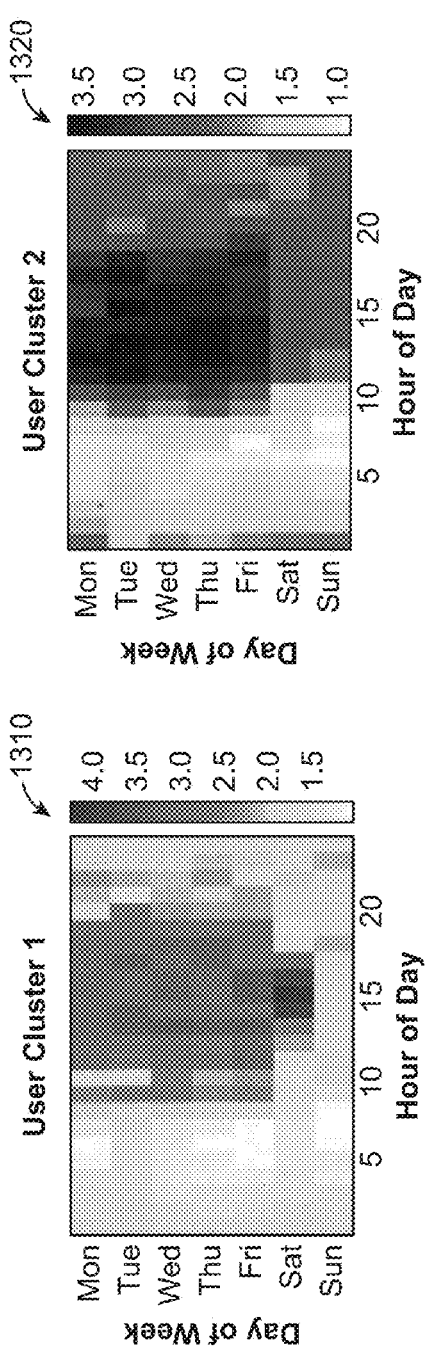
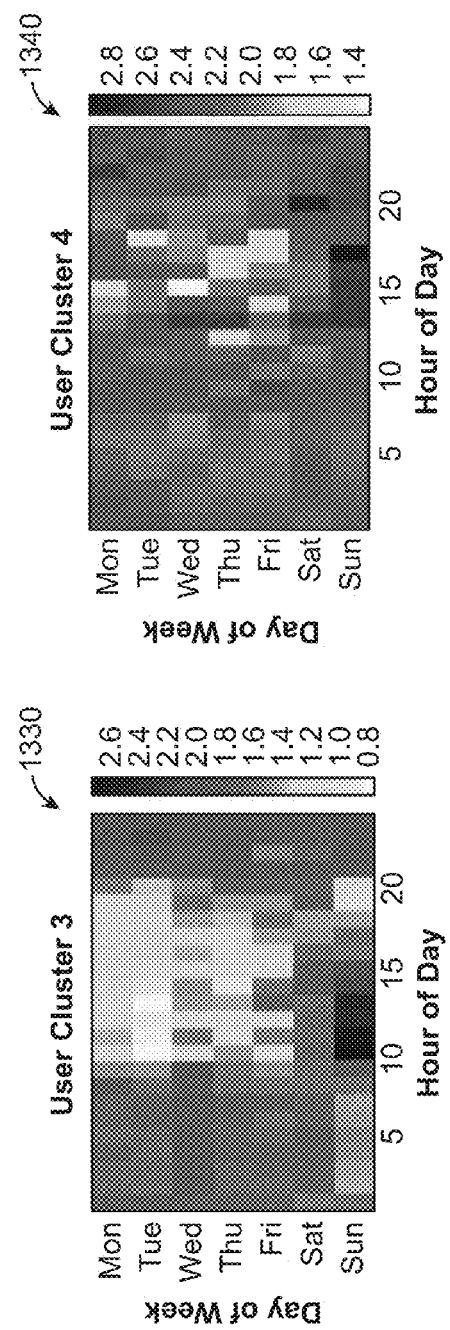
FIG. 12A
FIG. 12B
FIG. 12C
FIG. 12D

CONTEXT RECOGNITION AND SOCIAL PROFILING USING MOBILE DEVICES

CROSS-REFERENCE TO RELATED APPLICATION

This application claims the priority benefit of U.S. Provisional Patent Application Ser. No. 61/808,560, filed on Apr. 4, 2013, incorporated herein by reference.

TECHNICAL FIELD

One or more embodiments generally relate to use of Bluetooth® in mobile devices and, in particular, to use of Bluetooth® in mobile devices for context recognition and social profiling.

BACKGROUND

Mobile devices (e.g., smartphones) use embedded sensors, for example, global positioning system (GPS), accelerometer, Bluetooth®, and Wi-Fi, as well as increased capability in computation (e.g., CPU performance, battery life, and memory size). Among these various sensors, Bluetooth® is relatively more stable and less expensive because of low cost, less constraints (both indoor and outdoor), and less battery drain as compared to other sensors, such as GPS and Wi-Fi.

Bluetooth® sensors are typically used for exchanging files between devices within a short distance from one another, indoor location positioning by combining Bluetooth® and Wi-Fi signals, and estimating nearby device/people population in a crowd.

SUMMARY

One or more embodiments generally relate to using Bluetooth® information for determining user context and sociability. In one embodiment, a method provides receiving wireless sensor data from wireless sensor communication for an electronic device. In one embodiment, information units are formed using the wireless sensor data. In one embodiment, user context is inferred using the information units. In one embodiment, an entropy metric is computed based on the inferred user context. In one embodiment, social profiling is created based on the entropy metric and one or more user context characteristics.

In one embodiment a non-transitory computer-readable medium having instructions which when executed on a computer perform a method comprising: receiving wireless sensor data from wireless sensor communication for an electronic device. In one embodiment, information units are formed using the wireless sensor data. In one embodiment, user context is inferred using the information units. In one embodiment, an entropy metric is computed based on the inferred user context. In one embodiment, social profiling is created based on the entropy metric and one or more user context characteristics.

In one embodiment, a mobile device comprises a processor coupled to a memory. In one embodiment, the mobile device further includes a Bluetooth® sensor device and an application that uses the sensor device for receiving wireless sensor data from Bluetooth® communication between the mobile device and one or more electronic devices. In one embodiment, the application uses the processor for forming information units using the wireless sensor data, infers user context using the information units, computes an entropy metric based on the inferred user context, and creates social profiling based on the entropy metric and one or more user context characteristics.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 4 shows Bluetooth® information read from electronic device, according to an embodiment.

FIG. 8 shows an example Bluetooth® features, according to an embodiment.

FIG. 10 shows an example of pseudo-code for segmenting Bluetooth® information units, according to an embodiment.

FIG. 11A shows an example Bluetooth® feature map, according to an embodiment.

FIG. 11B shows an example Bluetooth® feature map with contexts, according to an embodiment.

FIGS. 12A-D show examples of Bluetooth® entropy mappings for different users, according to an embodiment.

DETAILED DESCRIPTION

Figure 1:
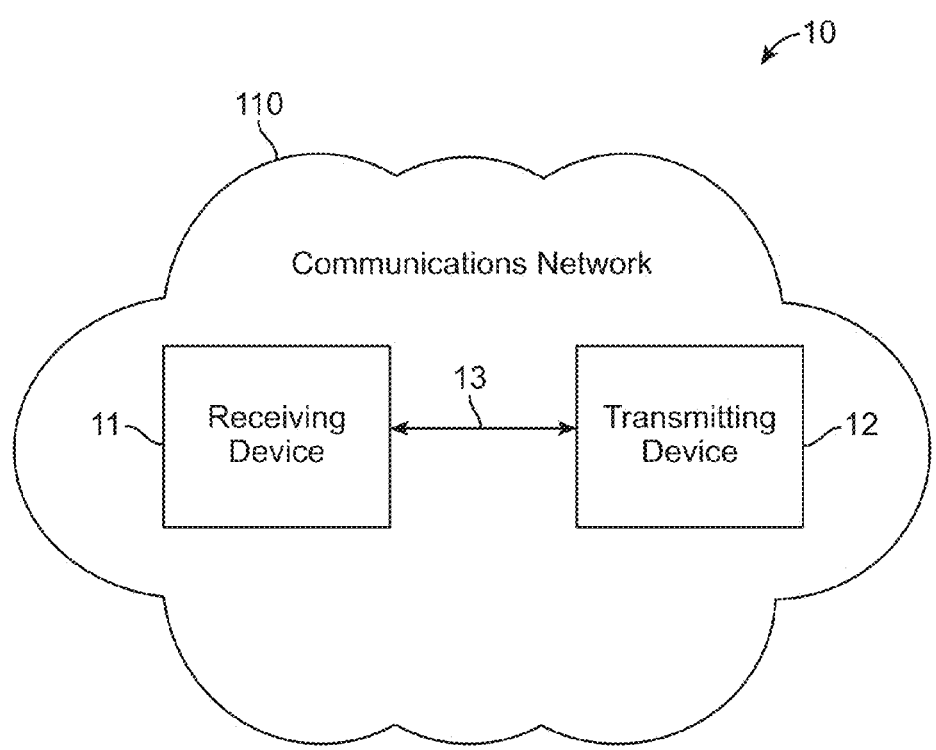
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide user/device profiling using one or more Bluetooth® sensors of a mobile electronic device. One embodiment may extend to include interoperability and functionality for profiling using additional sensing devices (e.g., GPS, Wi-Fi, accelerometer, application usage, etc.) for further context inference. One or more embodiments infer context using a comprehensive rich set of Bluetooth® features, for example, count features (e.g., the number of observed Bluetooth® devices), entropy features (e.g., the diversity of Bluetooth® readings), and semantic features (e.g., Bluetooth® device name and device category).

One or more embodiments provide sociability profiling or computation using a time defined weekly "Entropy Map" (e.g., 24 hours*7 days) to quantify an electronic device user's sociability and applying it for clustering users into different social-profiling groups. In one or more embodiments, if a user's Bluetooth® device entropy is always higher (frequently with new devices and with different types of devices), then the user may be more "social" as compared to other users of electronic devices. In one example embodiment, some users may be work-addicts (e.g., only work with colleagues in an office during weekdays in the daytime and stay at home "working" as well during the weekend/evening), while others may be more of a social-addict (e.g., always meeting new people/devices in the evening and weekend).

One or more embodiments establish a rich set of new Bluetooth® features for social context inference, where the feature not only include basic count features, but additional more useful "Entropy Features" that describe the diversity of Bluetooth® observations, and more meaningful "Semantic Features" that exploit the device category (e.g., whether a device is a PC, smartphone, laptop, tablet, wearable device, vehicle, etc.) and device names (e.g., John's iPhone, Bob's Galaxy S3, Tim's MacBook Pro, etc.).

One or more embodiments provide "Social Profiling" using the Bluetooth® features, e.g., dividing the users into a group of subsets according to their Bluetooth® features. In one example embodiment, 53 users may be divided into 4 "social-profile" categories: (a) only work during the daytime on weekdays, and not having much of a social life during spare time (weekend/evening), (b) both work a lot during weekday daytime and are social a lot during their spare time, (c) social a lot during spare times, but meet very less people during weekdays—e.g., maybe home-maker type of people, and (d) no significant difference between regular work-time and social time.

In one embodiment, a method provides receiving wireless sensor data from wireless sensor communication for an electronic device. In one embodiment, information units are formed using the wireless sensor data. In one embodiment, user context is inferred using the information units. In one embodiment, an entropy metric is computed based on the inferred user context. In one embodiment, social profiling is created based on the entropy metric and one or more user context characteristics.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
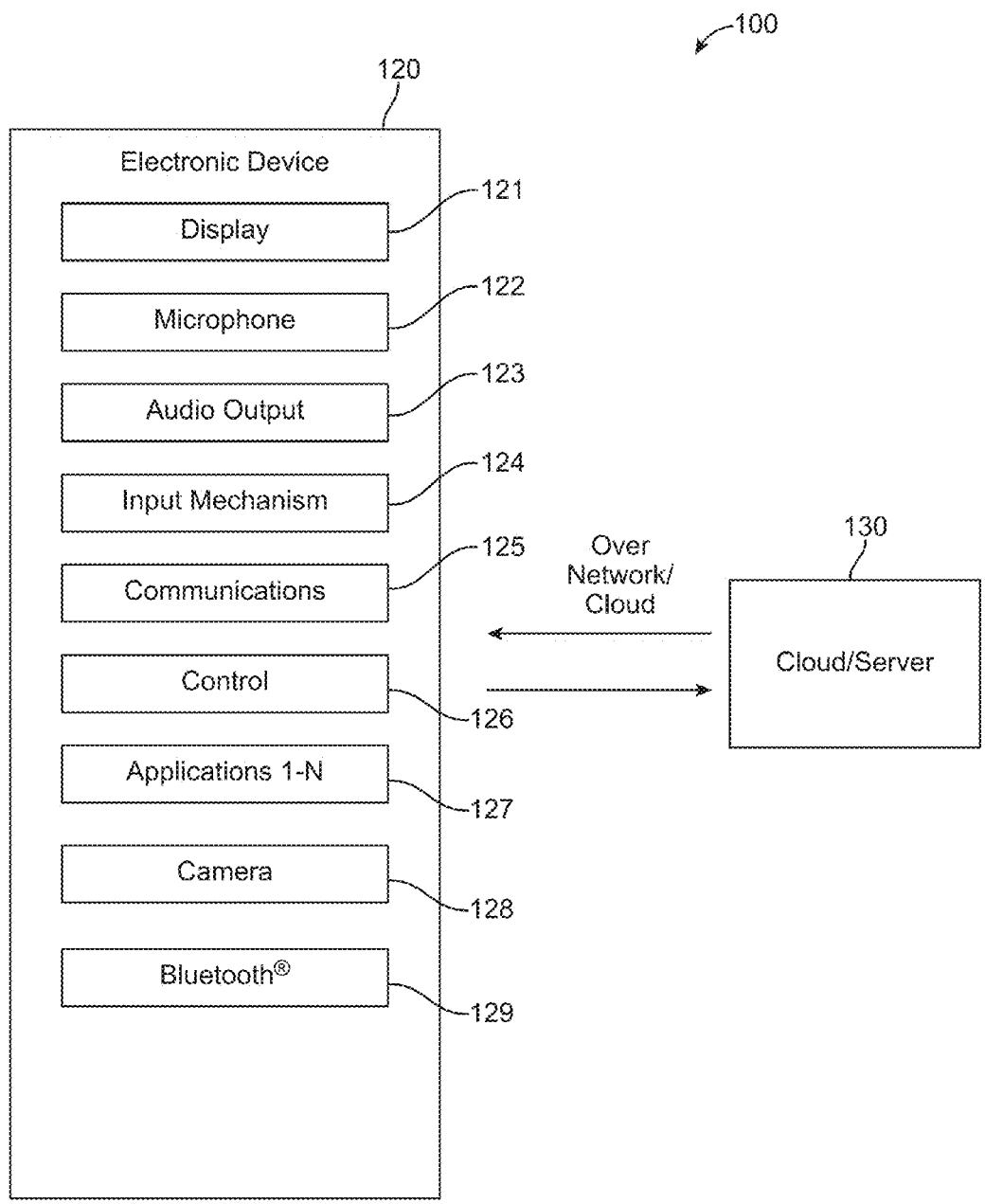
FIG. 2 shows a block diagram of an architecture for a system including a mobile device including a Bluetooth® sensor and Bluetooth® information processing, according to an embodiment.

FIG. 2 shows a functional block diagram of an architecture system 100 that may be used for using Bluetooth® in mobile devices for context recognition and social profiling. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera module 128, a Bluetooth® sensor and processing module 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset communicating with Bluetooth® sensor and processing module 129).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the Bluetooth® sensor and processing module 129 comprises or is connected to/with one or more sensors for reading Bluetooth® information from other electronic devices provided with Bluetooth® capability/functionality within a short proximity (e.g., less than 30 ft.), for providing Bluetooth® information to other devices, etc. In one embodiment, the Bluetooth® sensor and processing module 129 may include an application for processing Bluetooth® information for determining context inference and sociability profiling of users of Bluetooth® capable electronic devices, such as electronic device 120.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
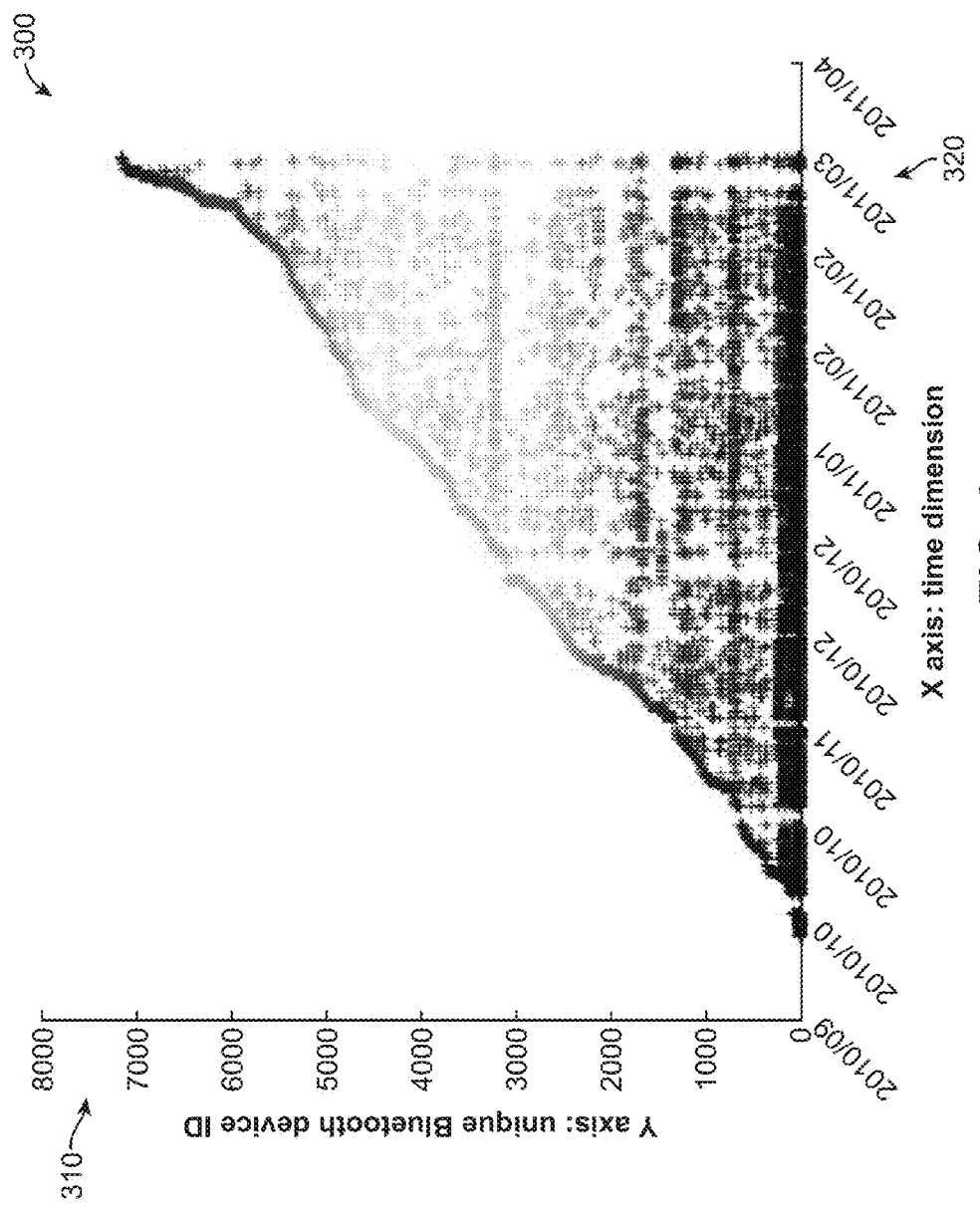
FIG. 3 shows a graph of Bluetooth® sensor readings for a mobile device, according to an embodiment.

FIG. 3 shows a graph 300 of Bluetooth® sensor readings for an electronic device 120, according to an embodiment. In one embodiment, the data represents a collection of a rich set of raw Bluetooth® readings—where as time increases, so does the number of encountered unique Bluetooth® devices (the X-axis 320 represents an increasing timeline (e.g., days, weeks, months), the Y-axis 310 represents the Bluetooth® unique devices that have been encountered by an electronic device 120.

FIG. 4 shows example Bluetooth® device information 400 read from an electronic device 120, according to an embodiment. The Bluetooth® specification defines a stack of technical APIs that supports a rich set of Bluetooth® data operations, e.g., (1) scan for nearby Bluetooth® devices, (2) query the paired Bluetooth® devices, (3) establish connection, and (4) make data transmission. In one embodiment, using a set of Bluetooth® APIs, an electronic device 120 may easily collect Bluetooth® scanning information during a user's daily life.

In one embodiment, for each device Bluetooth® scan, there is a set of corresponding MAC addresses 420 that are detected. For each MAC address 420, there is also an associated value of signal strength, i.e., Received Signal Strength Indication (RSSI) 450. In one embodiment, a Bluetooth® reading also includes the recording time 410, the device name 430 (if applicable, or empty/default value), and device class 440 that indicates which category the device falls under (e.g., computer, printer, phone, etc.). In one embodiment, the Bluetooth® device information may be read using the following form: r=<time, macAddress, name, class, rssi>, where the symbol r represents a read information variable.

Figure 5:
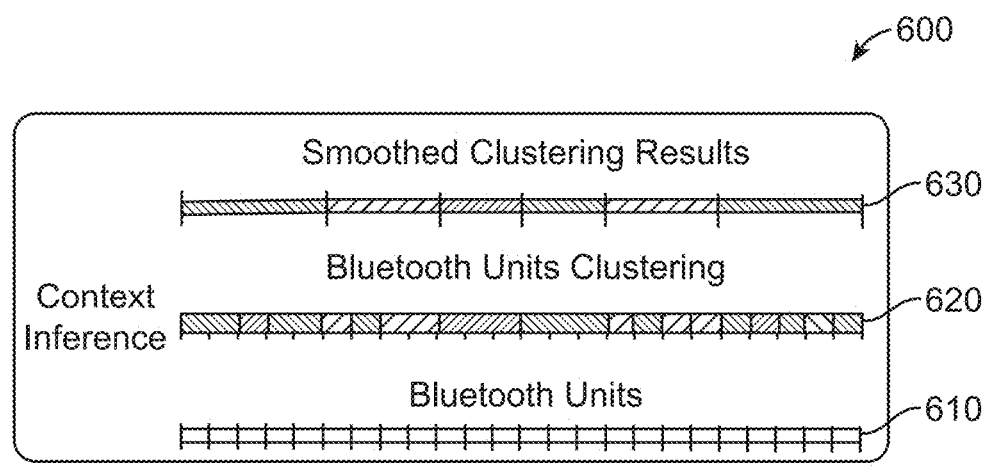
FIG. 5 shows an example diagram for context inference based on Bluetooth® information, according to an embodiment.

FIG. 5 shows an example diagram 600 for context inference based on the Bluetooth® information (e.g., Bluetooth® device information 400, FIG. 4), according to an embodiment. In one embodiment, the diagram 600 comprises a high level view of a process where the Bluetooth® information is divided into small units 610, which are then clustered into different contexts 620, and then the neighboring units sharing the same cluster number are smoothed (e.g., merged) into each individual complete context 630 (i.e., context is inferred and then smoothed).

Figure 6:
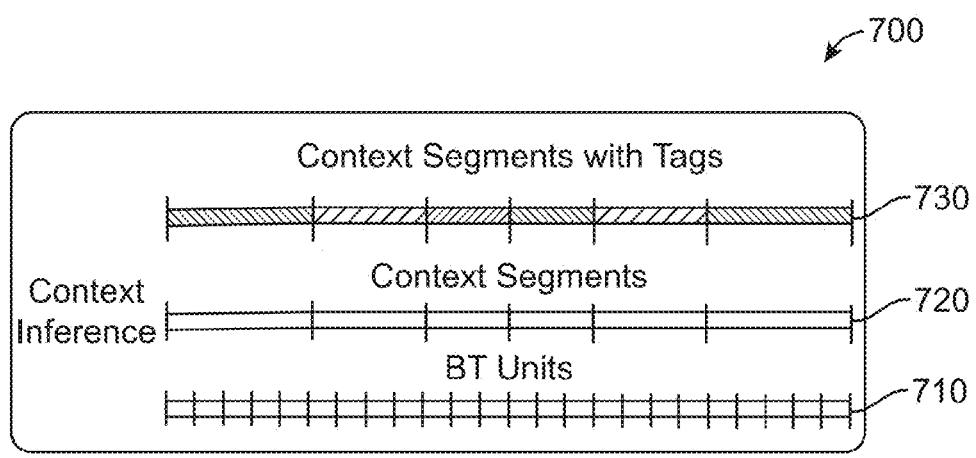
FIG. 6 shows another example diagram for context inference based on Bluetooth® information, according to an embodiment.

FIG. 6 shows another example diagram 700 for context inference based on Bluetooth® information (e.g., Bluetooth® device information 400, FIG. 4), according to an embodiment. In one embodiment, the diagram 700 comprises a high level view of a process where the Bluetooth® information is divided into small units 710, which is then merged into different context segments 720, and then the context is inferred by associating the context segments with tags 730 (i.e., segment and then infer context).

In one embodiment, in order to infer meaningful contexts out of raw Bluetooth® readings, preliminary steps may be taken, such as data cleaning or filtering. Similar to other wireless sensor data, such as GPS and Wi-Fi, Bluetooth® data may be noisy with errors and outliers that need to be filtered out. In one embodiment, the raw Bluetooth® information is processed as follows based on a weak RSSI signal and/or based on device sensing. In every Bluetooth® reading, the signal value RSSI indicates how powerful the received radio signal strength is. If the RSSI is too weak (i.e., rssi<Δrssi or particular signal strength threshold), such Bluetooth® reading may be removed from the collected information/data according to one embodiment. For come-and-go devices that effect Bluetooth® sensing, if an observed device stays in sensing range for an extremely short amount of time (i.e., duration<ΔD or a particular time threshold), such device is called a "come-and-go" device, which is typically because of a quick pass-by device or a scanning error. In one embodiment, such come-and-go devices may be filtered out or cleaned from the collected information/data. The detailed processing stages in FIGS. 5 and 6 are described below.

Figure 7:
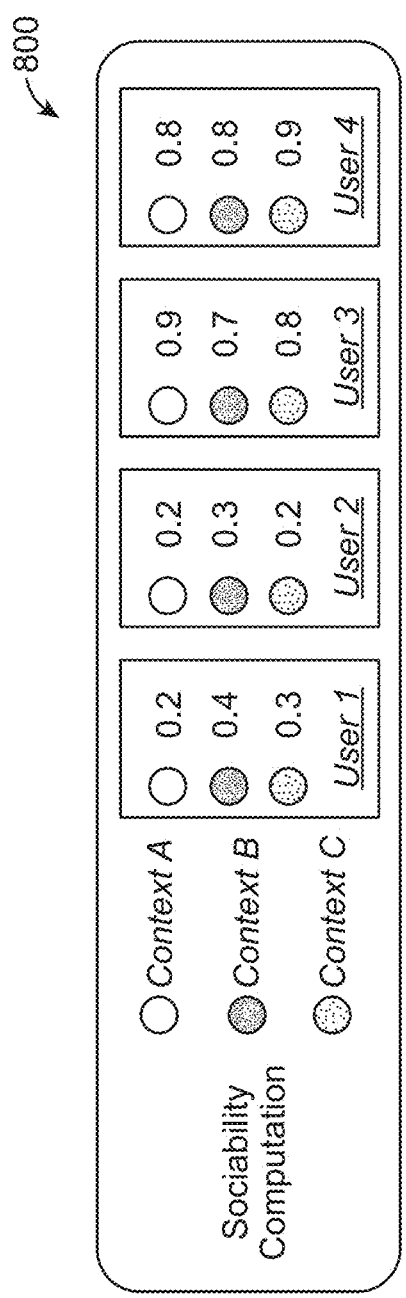
FIG. 7 shows an example diagram for sociability computation, according to an embodiment.

FIG. 7 shows an example diagram 800 for sociability computation, according to an embodiment. In one embodiment, "Bluetooth® entropy" is determined/computed using pre-inferred individual contexts. In one embodiment, the entropy may further be used to quantify the sociability of that user: e.g., (1) whether the user actively works with more people during work time, or mostly works alone; (2) whether the user is open and active during spare time to meet new people ('strangers'), or mostly interacts with a small fixed group of people, etc. In one embodiment, the dots/circles represent a sociability or context level (or metric).

FIG. 8 shows an example Bluetooth® features table 900, according to an embodiment. In one embodiment, a Bluetooth® unit is defined as a minimal window size in order to capture Bluetooth® features, in two main categories: Bluetooth® record features and Bluetooth® similarity features (the detailed feature definition is summarized in table 900). In one embodiment, Bluetooth® record Features are features directly computed from the Bluetooth® records inside a unit (e.g., Bluetooth® information 400, FIG. 4). In one embodiment, the Bluetooth® record features include count features ($F_{count}$) that basically count the total number of devices observed in the unit, entropy features ($F_{entropy}$) that indicate the device diversity in the unit, as well as semantic features ($F_{semantic}$) that concern the device class and name.

In one embodiment, Bluetooth® similarity features ($F_{similarity}$) are dedicated to measure the stability of two adjacent Bluetooth® units, based on various similarity metrics such as Jaccard index, cosine similarity, etc. In one embodiment, the Bluetooth® unit (i.e., a window indexed by w) of Bluetooth® readings from multiple scans from time t1 to t2, i.e., U={rt1 . . . , rt2}. In one embodiment, the Bluetooth® unit may be encapsulated as a set of features, i.e., Uw=[w: $F_{counter}$, $F_{entropy}$, $F_{semantic}$, $F_{similarity}$].

Figure 9:
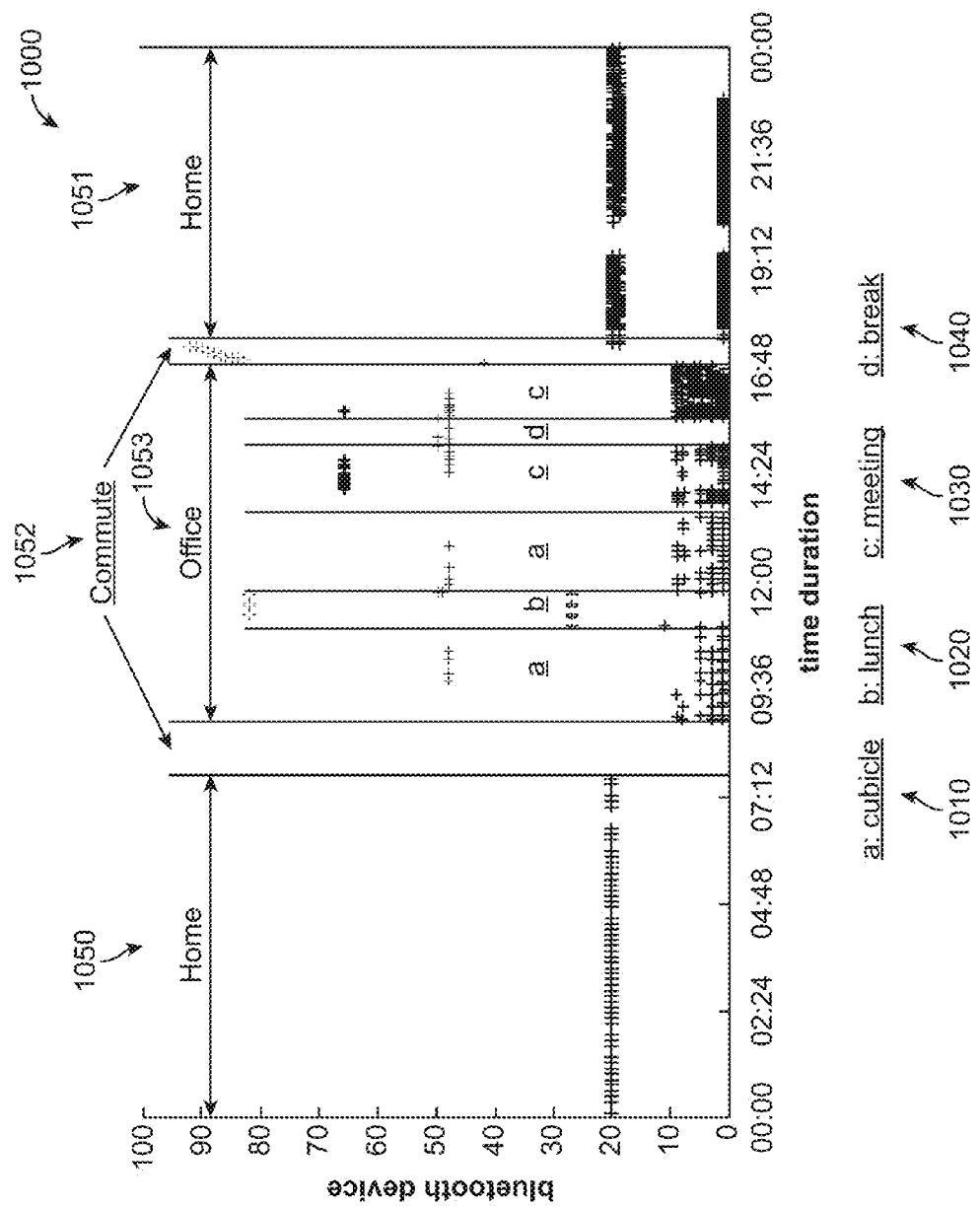
FIG. 9 shows an example of Bluetooth® readings with context tags, according to an embodiment.

FIG. 9 shows an example graph 1000 of Bluetooth® readings with context tags, according to an embodiment. In one example embodiment, graph 1000 shows one-day Bluetooth® data with associated contexts that were tagged by a user of an electronic device 120 (FIG. 2). In one example embodiment, the contexts are indicated as home 1050 and 1051, commute 1052, and office 1053. In one embodiment, other contexts or sub-contexts may include a) cubicle 1010, b) lunch 1020, c) meeting 1030 and d) break 1040. In one example embodiment, the Bluetooth® information/data is graphed with the X axis indicating times of the day, and the Y axis indicating unique number/ID of Bluetooth® devices for collection of the Bluetooth information/data.

In one embodiment, the correlation between Bluetooth® data and the ground-truth tags may be observed, e.g., (1) Bluetooth® readings at home 1050/1051 are much more stable compared to the readings in the office 1053; (2) the same type of contexts share similar Bluetooth® readings, e.g., two 'a:cubicle' 1010 context instances; (3) different contexts in the office 1053 may be detected using the variation of Bluetooth® readings, especially these short-term contexts appearing between longer-term contexts, e.g., 'b:lunch' 1020 between the two 'a:cubicle' 1010 contexts and 'd:break' 1040 between the two 'c:meeting' 1030 contexts. In one embodiment, the contexts are inferred based on a rich set of Bluetooth® features (e.g., features 900, FIG. 8).

FIG. 10 shows an example of pseudo-code 1100 for segmenting Bluetooth® information units, according to an embodiment. In one example embodiment, two different context inference approaches may be used: (1) Segmentation and (2) smoothing (as already shown in FIG. 6, and FIG. 5, respectively). In one embodiment, with segmentation the complete sequence of Bluetooth® units are divided or separated into several segments, where each segment indicates an underlying activity or context. In one embodiment, after segmentation, clustering or classification is applied to the segments to infer the latent contexts. In one example embodiment, segmentation may be provided based on the pseudo-code or process 1100.

In one embodiment, a Bluetooth® segment (S) comprises a sequence of adjacent Bluetooth® units that contain 'homogeneous' features indicating a latent context, i.e., S={Uw1, . . . , Uw2}—where such 'homogeneous' features may be captured by a single regression model with the model error less than a given threshold.

In one example embodiment, for smoothing, first the latent contexts are directly inferred for each individual Bluetooth® unit, and the neighboring and similar Bluetooth® units are smoothed (e.g., merged) together based on their similarity characteristics. In one embodiment, the similarity features are applied for Bluetooth® smoothing, i.e., if the similarity between two neighboring Bluetooth® units is less than a given threshold, the Bluetooth® units may be smoothed together.

FIG. 11A shows an example Bluetooth® feature map 1200, according to an embodiment. In one embodiment, the map 1200 is used for mapping a user of an electronic device 120 (FIG. 2) Bluetooth® interactions with other Bluetooth® electronic devices. In one embodiment, the example map 1200 maps Bluetooth® interactions based on seven (7) days a week and 24 hours a day, where the X axis indicates the hours in a day, and the Y axis indicates days of the week.

FIG. 11B shows an example Bluetooth® feature map 1210 with contexts C1-C6 (i.e., overlaid on the map 1200), according to an embodiment. In one embodiment, the similarity as well as the diversity between different users in their contexts (e.g., working-time at office, spare-time at weekend) is analyzed. Based on the outputs from context inference, the user's sociability may be determined by checking their contexts' characteristics. In one example embodiment, for the same type of contexts such as "office-work," some users may have a lot of Bluetooth® interactions with colleagues/customers, while others mostly work alone. In one example embodiment, for each context type, the Bluetooth® features (e.g., count, entropy, semantic) may be determined among such context. In one embodiment, based on these features, clustering processes are applied to further categorize different users into various "sociability" groups. In one example embodiment, the definition of "sociability" may quite broad based on statistical features, which may be driven by electronic device user's real personality (social or not) or caused by their profiles, e.g., job title: a manager needs to frequently meet others, while a junior employee may mostly work by himself/herself, a waitress in a restaurant is more "social" compared to a researcher working in office based on their daily Bluetooth® interactions.

In one embodiment, to provide a more intuitive explanation, FIG. 11B shows the 24 hours ×7 days Bluetooth® feature map. In one example embodiment, for most electronic device 120 users, the map 1200 is divided into six main temporal contexts: C1 (weekday early morning), C2 (weekday working time, e.g. typically in an office or workplace), C3 (weekday evening), C4 (weekend early morning), C5 (weekend daytime), and C6 (weekend evening). In one example embodiment, instead of a raw 24×7 feature map, a basic "sociability profile" using the features from such 6 contexts, i.e., <F1, . . . , F6> is employed.

The actual choice of feature Fi in each context Cj may be Bluetooth® count, Bluetooth® entropy, or even Bluetooth® semantic features. In one example embodiment, a "Bluetooth® Count Map" and "Bluetooth® Entropy Map" may be formed. In one embodiment, these detailed values in the map are not from individual Cj context, but determined by a set of Cj context instances, e.g., calculating their mean and variance.

FIGS. 12A-D show examples of Bluetooth® entropy mappings (1310, 1320, 1330 and 1340) for different users, according to an embodiment. In one embodiment, clustering algorithms (e.g., k-means) are applied to cluster users based on their "sociability profile" from a Bluetooth® entropy map. In one example embodiment, for k=4 in k-means and data for multiple users (e.g., 53 users), four representative user types are identified in FIGS. 12A-D: (1) UserCluster1 1310 mainly has high entropy in the daytime for working days and very low entropy in spare time, including evenings and weekend; (2) compared to UserCluster1, UserCluster2 1320 has higher entropy most times, especially during the evening and weekend, but still has higher entropy during working daytime; (3) on the contrary, UserCluster3 1330 has lower entropy during working daytime as compared to other times; and (4) UserCluster4 1340 has no clear difference amongst all times during the weekday and weekend.

In one example embodiment, performance in clustering electronic device 120 users based on their sociability, may be checked using collected Bluetooth® data. In one example embodiment, the data may be split into training (Dtrain) data and testing (Dtest) data. In one example embodiment, for each valid electronic device user, all or the user's valid days are divided into half days for Dtrain and the other half for Dtest. In one example embodiment, by assumption, the entropy map from training and testing days should be consistent (in general) and therefore the computed sociability clustering from Dtrain and Dtest should be consistent.

In one example embodiment, different from the context inference using the fixed (k=6) for six (6) ground-truth tags, here a varying number of k=[4:8] are tested for computing sociability clusters of the multiple users (e.g., 53 users). In one embodiment, for each k, TrainClusters={$trc_1$, . . . , $trc_k$} are computed from Dtrain and TestClusters={$tsc_1$, . . . , $tsc_k$} from Dtest; by assuming the TrainClusters is the pseudo ground truth, then evaluation of TrainClusters using the four clustering metrics may be performed, i.e., NMI, F-measure, Rand Index, Purity. In one embodiment, two main observations may be made: (1) both Bluetooth® count and Bluetooth Entropy® map may have good performance in computing sociability clusters, e.g., nearly 80% accuracy for many clustering metrics; (2) the Bluetooth® entropy gains better performance as compared to Bluetooth® count in almost all cases. In one example, the only exception is Purity and F-measure at k=8, which might be because of k=8 being too big for grouping not so many users (e.g., 53) based on their sociability. In one embodiment, advanced clustering algorithms may be applied such that the k value may be determined automatically.

Figure 13:
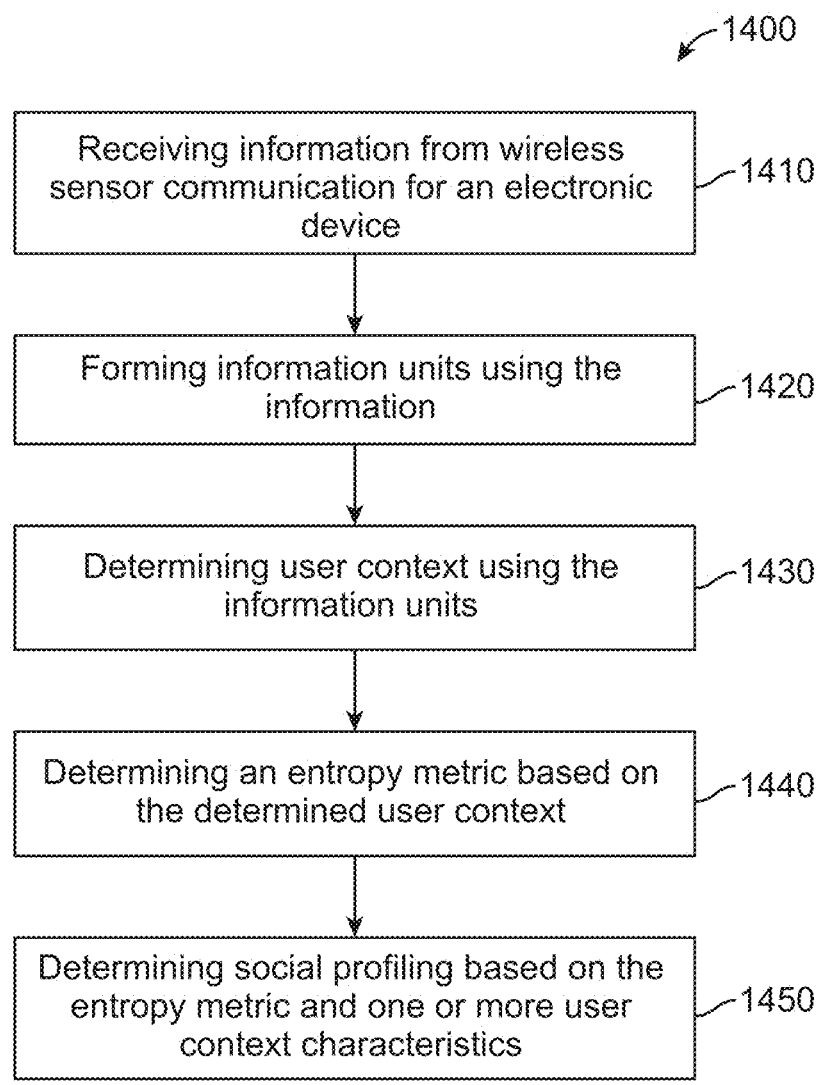
FIG. 13 shows a flowchart for using Bluetooth® information for determining user context and sociability, according to an embodiment.

FIG. 13 shows a flowchart 1400 for using Bluetooth® information for determining user context and sociability, according to an embodiment. In one embodiment, in block 1410 information (e.g., Bluetooth® wireless sensor data/ information) is received from wireless sensor (e.g., a Bluetooth® sensor) communication for an electronic device (e.g., electronic device 120, FIG. 2). In one embodiment, in block 1420 information units (e.g., Bluetooth® units) are formed using the information. In one embodiment, in block 1430 user context is determined/inferred using the information units. In one embodiment, in block 1440 an entropy metric is determined/computed based on the determined/inferred user context. In one embodiment, in block 1450 social profiling is determined/created based on the entropy metric and one or more user context characteristics.

In one embodiment, in the flowchart 1400, the information comprises one or more of time, media access control (MAC) address, device name, device class and RSSI. In one embodiment, the flowchart 1400 further comprises filtering the information based on one or more of an RSSI signal threshold and duration of sensed device (e.g., a duration threshold). In one embodiment, the information units comprise Bluetooth® features, and each information unit comprises a minimum window size for capturing the Bluetooth® features. In one embodiment, the Bluetooth® features comprise record features and stability features, where the record features comprise one or more of count features, entropy features and semantic features, and the stability features comprise a measure of stability of neighboring information units based on one or more similarity metrics.

In one embodiment, determining/inferring user context comprises one or more of segmenting the information units and smoothing the information units, where segmenting comprises dividing a sequence of information units into segments of information units based on user context and classifying the segments of information units according to context, and smoothing the information units comprises inferring user context for each information unit and merging neighboring and similar information units based on similarity characteristics.

In one embodiment, determining/computing the entropy metric is based on mapping a number of communication interactions between the electronic device and other devices during time segments, and determining/creating social profiling comprises segmenting the mapping into temporal contexts.

Figure 14:
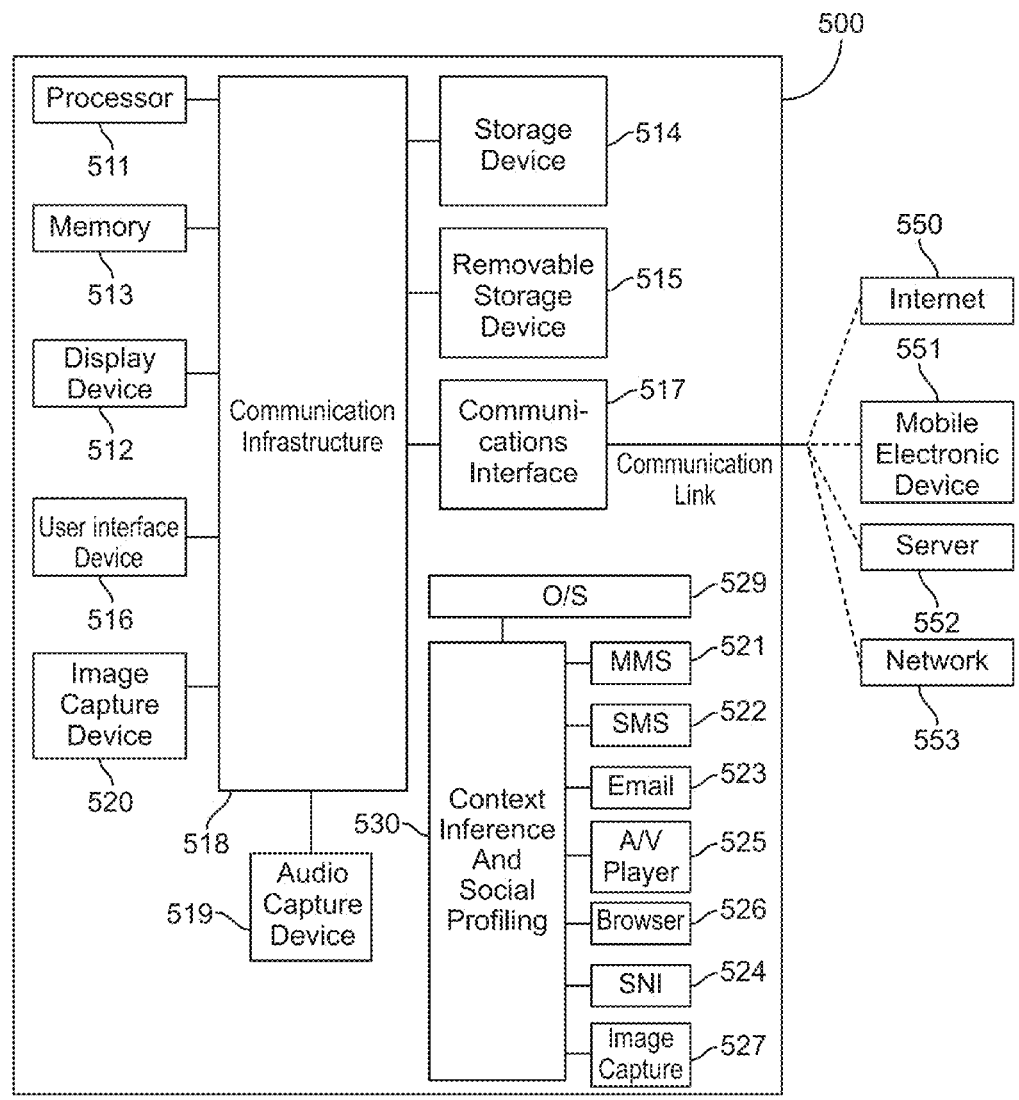
FIG. 14 is a high-level block diagram showing an information processing system comprising a computing system implementing one or more embodiments.

FIG. 14 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a context inference and social profiling module 530 that may implement a process using Bluetooth® information for determining context and social profiling. In one embodiment, the context inference and social profiling module 530 may implement the process of flowchart 1400 (FIG. 13). In one embodiment, the context inference and social profiling module 530 along with an operating system 529 may be implemented as executable code residing in a memory of the system 500. In another embodiment, the context inference and social profiling module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving wireless sensor data from wireless sensor communication for an electronic device;
   forming information units using the wireless sensor data, the information units comprise wireless features including entropy features and at least one of count features and semantic features, each information unit comprises a minimum window size for capturing the wireless features, wherein the entropy features comprise a diversity of wireless readings reflecting contextual characteristics from multiple wireless devices;
   inferring user context using the information units;
   computing an entropy metric based on the inferred user context; and
   creating social profiling based on the entropy metric and at least one user context characteristic.

2. The method of claim 1, wherein the wireless sensor communication comprises Bluetooth® sensor communication.

3. The method of claim 2, wherein the wireless sensor data comprises at least one of time, media access control (MAC) address, device name, device class and received signal strength indication (RSSI).

4. The method of claim 3, wherein the wireless sensor data is filtered based on at least one of an RSSI signal threshold and duration of sensed device.

5. The method of claim 4, wherein the wireless features comprise Bluetooth® features.

6. The method of claim 5, wherein the Bluetooth® features comprise record features and stability features.

7. The method of claim 6, wherein the record features comprise at least one of the count features, the entropy features and the semantic features, and the stability features comprise a measure of stability of neighboring information units from the multiple electronic devices based on at least one similarity metric.

8. The method of claim 7, wherein inferring user context comprises at least one of segmenting the information units and smoothing the information units.

9. The method of claim 8, wherein segmenting comprises dividing a sequence of information units into segments of information units based on user context and classifying the segments of information units according to context, and smoothing the information units comprises inferring user context for each information unit and merging neighboring and similar information units based on similarity characteristics.

10. The method of claim 9, wherein computing the entropy metric is based on mapping a number of communication interactions between the electronic device and the multiple electronic devices during time segments, and creating social profiling comprises segmenting the mapping into temporal contexts.

11. The method of claim 1, wherein the electronic device is a mobile electronic device.

12. A non-transitory processor-readable medium that includes a program that when executed by a processor performs a method comprising:
   receiving wireless sensor data from wireless sensor communication for an electronic device;
   forming information units using the wireless sensor data, the information units comprise wireless features including entropy features and at least one of count features and semantic features, each information unit comprises a minimum window size for capturing the wireless features, wherein the entropy features comprise a diversity of wireless readings reflecting contextual characteristics from multiple wireless devices;
   inferring user context using the information units;
   computing an entropy metric based on the inferred user context; and
   creating social profiling based on the entropy metric and at least one user context characteristic.

13. The non-transitory processor-readable medium of claim 12, wherein the wireless sensor communication comprises Bluetooth® sensor communication.

14. The non-transitory processor-readable medium of claim 13, wherein the wireless sensor data comprises at least one of time, media access control (MAC) address, device name, device class and received signal strength indication (RSSI).

15. The non-transitory processor-readable medium of claim 14, wherein the wireless sensor data is filtered based on at least one of an RSSI signal threshold and duration of sensed device.

16. The non-transitory processor-readable medium of claim 15, wherein wireless features comprise Bluetooth® features.

17. The non-transitory processor-readable medium of claim 16, wherein the Bluetooth® features comprise record features and stability features.

18. The non-transitory processor-readable medium of claim 17, wherein the record features comprise at least one of the count features, the entropy features and the semantic features, and the stability features comprise a measure of stability of neighboring information units from the multiple electronic devices based on at least one similarity metric.

19. The non-transitory processor-readable medium of claim 18, wherein inferring user context comprises at least one of segmenting the information units and smoothing the information units.

20. The non-transitory processor-readable medium of claim 19, wherein segmenting comprises dividing a sequence of information units into segments of information units based on user context and classifying the segments of information units according to context, and smoothing the information units comprises inferring user context for each information unit and merging neighboring and similar information units based on similarity characteristics.

21. The non-transitory processor-readable medium of claim 20, wherein computing the entropy metric is based on mapping a number of communication interactions between the electronic device and the multiple electronic devices during time segments, and creating social profiling comprises segmenting the mapping into temporal contexts.

22. The non-transitory processor-readable medium of claim 12, wherein the electronic device is a mobile electronic device.

23. A mobile device comprising:
a memory storing an application that uses the wireless sensor device to receive wireless sensor data from wireless communication between the mobile device and multiple electronic devices;
a wireless sensor device; and
a processor coupled to the memory, wherein the processor is configured to execute the application to form information units using the wireless sensor data, to infer user context using the information units, to compute an entropy metric based on the user context, and to create social profiling based on the entropy metric and at least one user context characteristic, the information units comprise wireless features including entropy features and at least one of count features and semantic features, each information unit comprises a minimum window size for capturing the wireless features, and the entropy features comprise a diversity of wireless readings reflecting contextual characteristics from the multiple wireless devices.

24. The mobile device of claim 23, wherein the wireless sensor data comprises at least one of time, media access control (MAC) address, device name, device class and received signal strength indication (RSSI), and the processor is configured to execute the application to filter the information based on at least one of an RSSI signal threshold and duration of a sensed device.

25. The mobile device of claim 24, wherein the wireless features comprise Bluetooth® features, the Bluetooth® features include record features that comprise at least one of count features, entropy features and semantic features, and stability features, and the stability features comprise a measure of stability of neighboring information units based on at least one similarity metric.

26. The mobile device of claim 25, wherein the processor is configured to execute the application to infer user context by at least one of segmenting the information units and smoothing the information units.

27. The mobile device of claim 26, wherein the processor is configured to execute the application to segment the information units by dividing a sequence of information units into segments of information units based on user context and classifying the segments of information units according to context, and to smooth the information units by inferring user context for each information unit and merging neighboring and similar information units based on similarity characteristics.

28. The mobile device of claim 27, wherein the processor is configured to execute the application to compute the entropy metric by mapping a number of communication interactions between the mobile device and the multiple electronic devices during particular time segments, and to create social profiling by segmenting the mapping into temporal contexts.

29. The mobile device of claim 23, wherein the mobile device comprises at least one of a mobile telephone, a tablet device, a wearable device and a mobile computing device.

* * * * *